United States Patent
Krugler, Jr.

[11] 3,726,568
[45] Apr. 10, 1973

[54] ACTUATOR FOR AN ANTISKID BRAKE SYSTEM

[75] Inventor: Allen D. Krugler, Jr., Livonia, Mich.

[73] Assignee: Ford Motor Company, Dearborn, Mich.

[22] Filed: Jan. 9, 1970

[21] Appl. No.: 1,663

[52] U.S. Cl. ................................303/21 F, 303/10
[51] Int. Cl. ..................................................B60t 8/08
[58] Field of Search............................188/181, 170; 303/21, 6, 10, 61, 58; 340/70, 72; 418/52, 53; 60/DIG. 2; 180/1

[56] References Cited

UNITED STATES PATENTS

| | | | |
|---|---|---|---|
| 3,532,391 | 10/1970 | Klein | 303/21 F |
| 3,401,984 | 9/1968 | Williams et al. | 303/21 BE |
| 3,521,934 | 7/1970 | Leiber | 303/21 F |
| 3,480,336 | 11/1969 | Clark et al. | 303/21 F |
| 3,549,211 | 12/1970 | Leiber | 303/21 F |
| 3,276,822 | 10/1966 | Lister et al. | 303/21 F |
| 3,495,880 | 2/1970 | Gratsch | 303/21 F |
| 2,259,264 | 10/1941 | Parsons | 60/DIG. 2 |
| 2,330,739 | 9/1943 | Piron | 60/DIG. 2 |
| 3,477,346 | 11/1969 | Slavin et al. | 303/21 F UX |
| 3,512,844 | 5/1970 | Stelzer | 303/21 F |
| 3,588,189 | 6/1971 | Cumming | 303/21 F |

Primary Examiner—Milton Buchler
Assistant Examiner—Stephen G. Kunin
Attorney—John R. Faulkner and Donald J. Harrington

[57] ABSTRACT

An actuator for controlling wheel brake pressure in fluid pressure operated wheel brakes for a wheeled vehicle whereby wheel skid is controlled, said actuator comprising a pump in the wheel brake fluid circuit, a motor for actuating the pump and a control system for actuating the motor in response to changes in a synthesized wheel slip signal.

2 Claims, 6 Drawing Figures

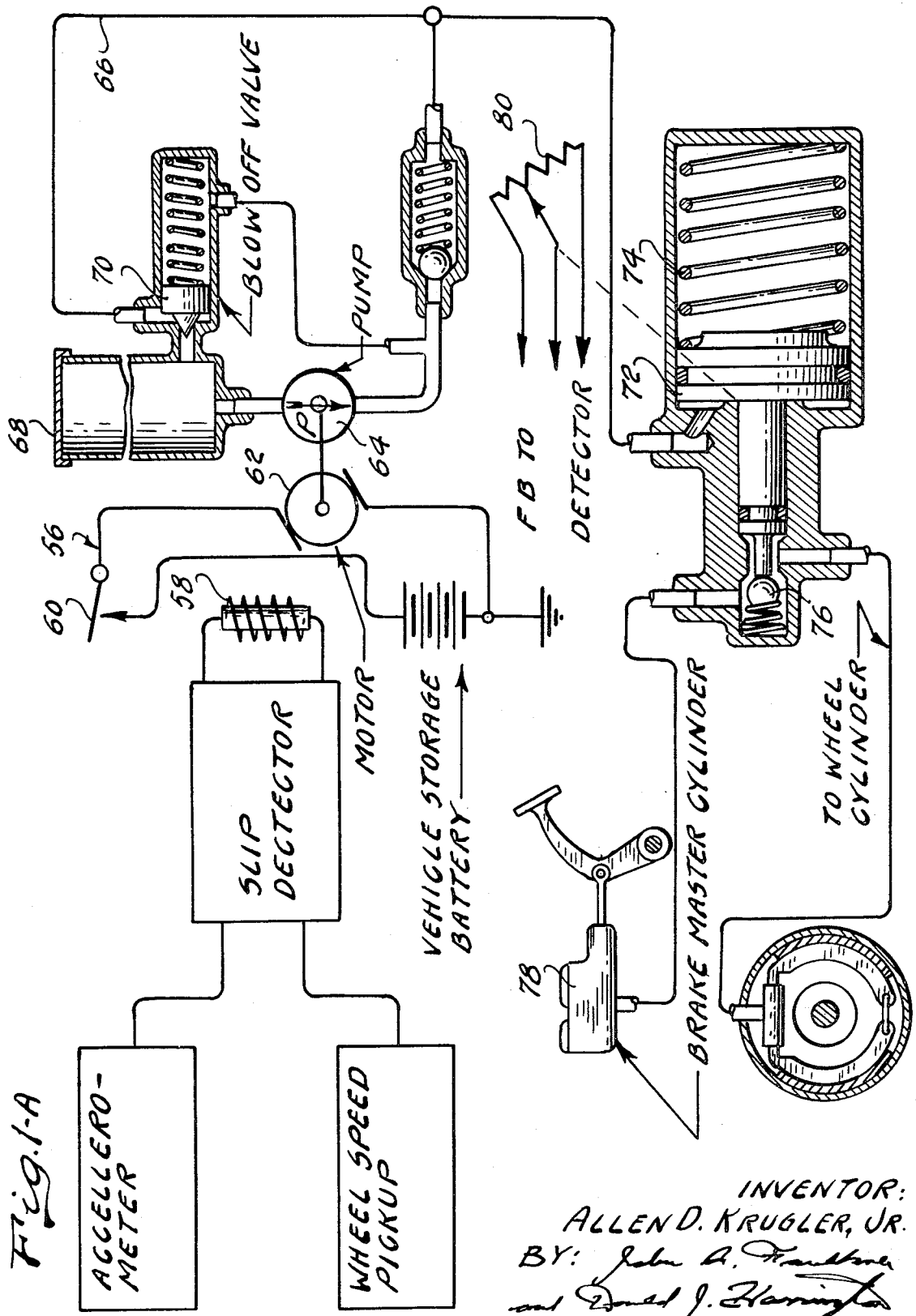

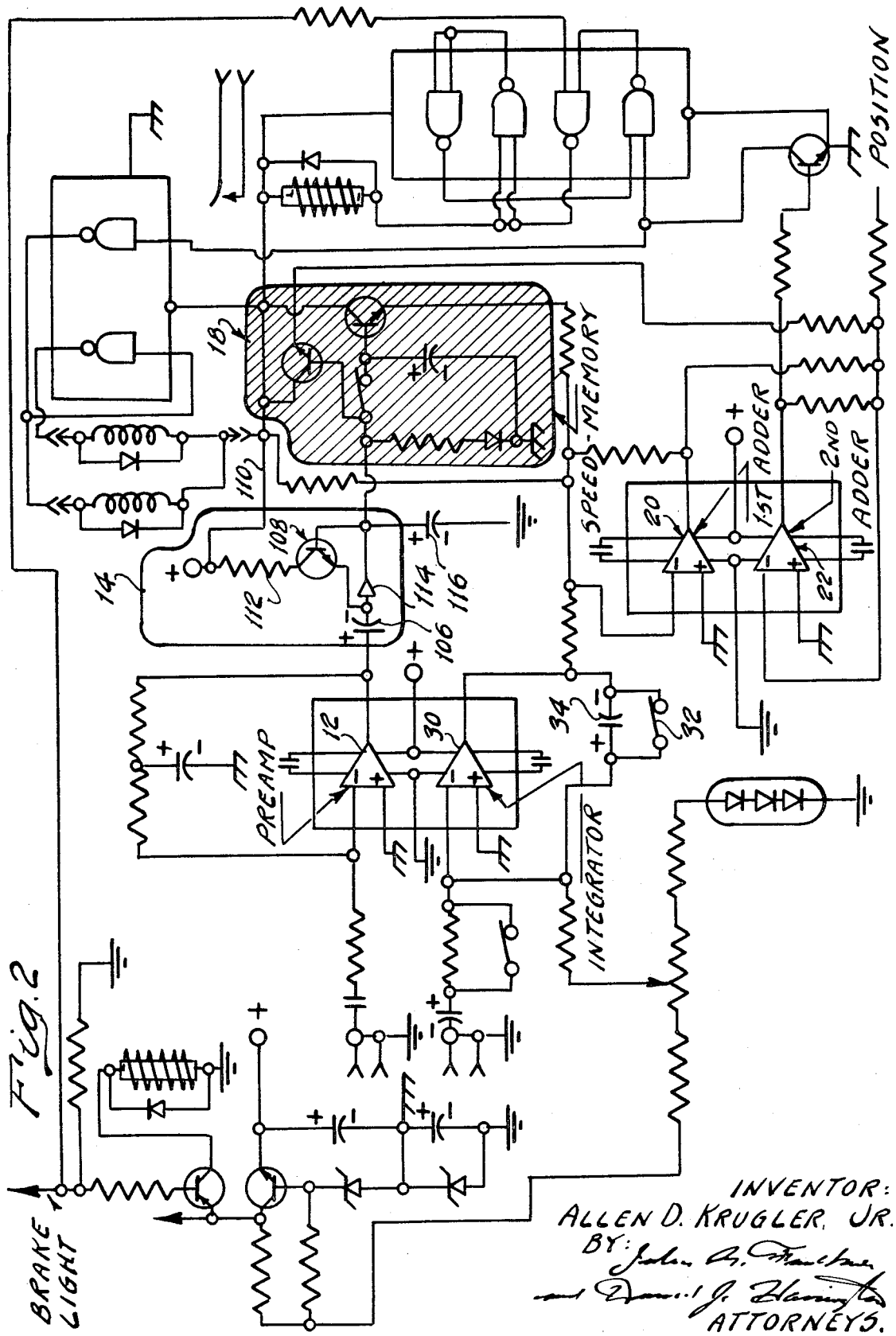

ACTUATOR FOR AN ANTISKID BRAKE SYSTEM

GENERAL DESCRIPTION OF THE INVENTION

The improvements of my invention are adapted to be used in the antiskid brake system I have disclosed in my copending application Ser. No. 1,664, filed Jan. 9, 1970, now U.S. Pat. No. 3,622,208. Reference may be had to that application for a particular description of a wheel brake pressure actuator and a control circuit for producing input voltage pulses. The braking pressure of the vehicle wheel brakes is modified when a voltage signal representing the wheel slip percentage exceeds a predetermined value.

The control system of my present invention responds to a wheel slip signal by triggering the operation of a motor which drives a pump located in the wheel brake pressure circuit. The wheel brake pressure then is modified when the motor becomes active, and the modified pressure energizes an actuator piston for the wheel brakes. The position of the piston is sensed by a feedback mechanism which in turn controls the slip detector circuit thereby improving the frequency response and avoiding over-correction of the wheel braking.

BRIEF DESCRIPTION OF THE FIGURES OF THE DRAWING

FIG. 1A shows in diagram form the actuator pump and the control circuit for controlling the actuator pump, which circuit responds to the output signal of the structure of FIG. 1.

FIG. 2 shows a working embodiment of the preamplifier, the integrator, the frequency to voltage converter and the adders used in the circuit of FIG. 1.

PARTICULAR DESCRIPTION OF THE INVENTION

Figure 1:
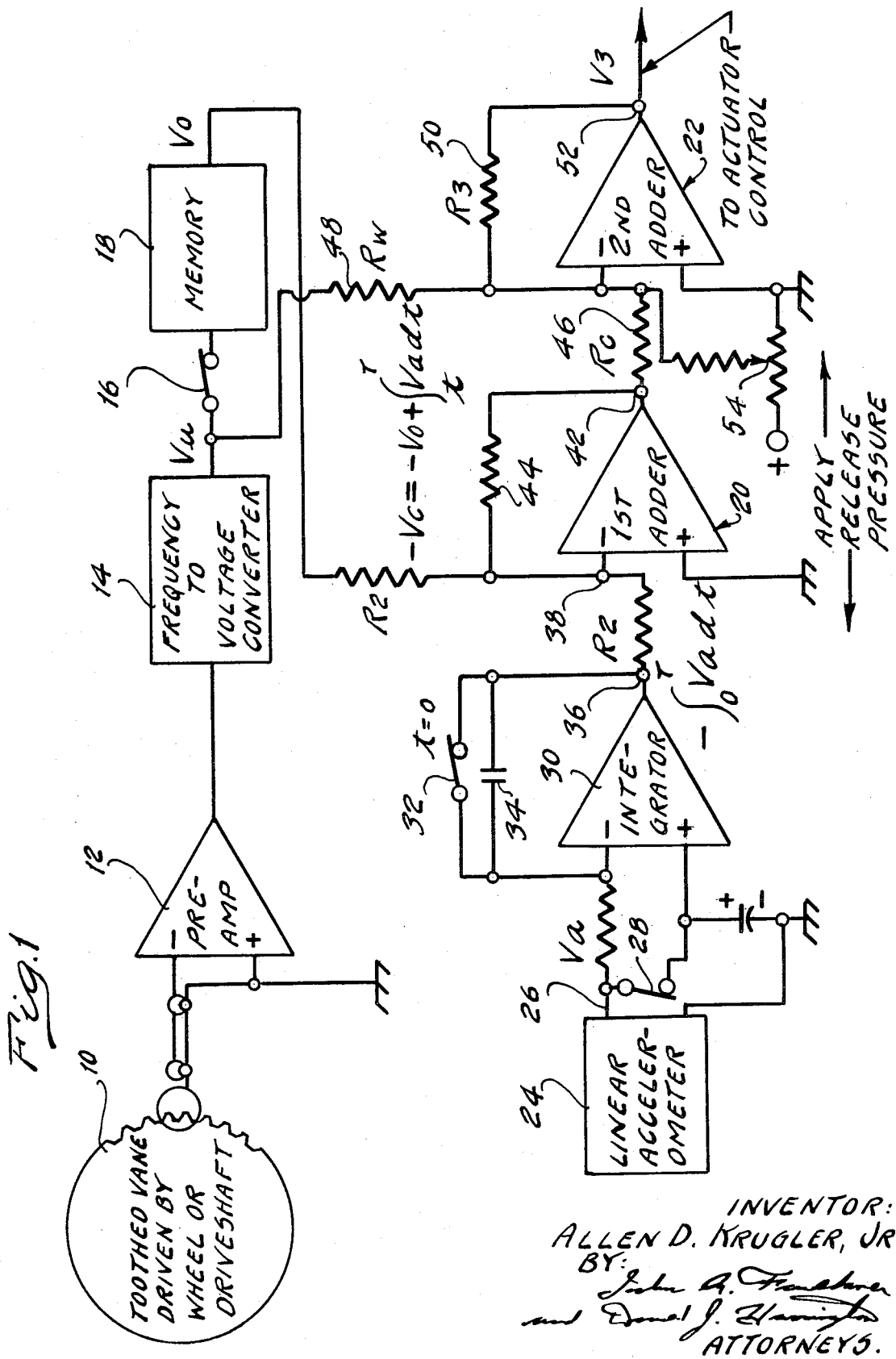
FIG. 1 is a schematic circuit drawing of the improved wheel slip signal generating components, including both wheel velocity and vehicle speed analog devices.

In FIG. 1 numeral 10 designates in schematic form a wheel speed pick-up device. This can be in the form of a toothed disc drivably connected to a vehicle wheel or, in the case of a rear wheel drive vehicle, to the driveshaft for the rear traction wheels. The individual teeth of the disc, as they are rotated by the vehicle wheel or the driveshaft, pass through the inductance field of an inductance coil, thereby providing voltage pulses, the frequency of which is an indicator of the speed of rotation of the disc. These pulses are distributed to a preamplifier circuit 12, the output of which is an amplified voltage signal with a rectangular wave form of constant amplitude. A frequency to voltage converter 14 receives the signal of the preamplifier and develops a DC voltage signal having an average value that is proportional to vehicle speed.

A switch 16 connects the output side of the frequency to voltage converter 14 with a memory circuit 18. The memory circuit then receives continuously a signal from wheel speed pick-up device 10 whenever the vehicle is operating in a normal driving mode without braking. The output voltage $V_O$ supplied from the memory circuit at that time is equal to the output voltage $V_u$ of the frequency to voltage converter.

When the vehicle brakes are applied, switch 16 is opened. This marks the initiation of the braking mode at the instant $t=0$. At that time the memory circuit is isolated from the pick-up device 10. Although the wheel speed may fall to a value less than the value that existed at $t=0$, the output voltage $V_O$ remains constant. This then is a so-called memorized voltage.

The actual wheel speed, which is indicated by the voltage signal $V_u$, becomes less than the vehicle speed that existed at $t=0$ as soon as incipient wheel slipping occurs.

The memorized voltage $V_O$ is distributed to the first adder circuit 20 and the signal $V_u$ is distributed to a second adder circuit 22. Both signals are used by the two adder circuits as well as a signal that represents the linear deceleration of the vehicle. This signal is obtained by a linear accelerometer 24 which responds to inertia forces to develop a signal in line 26 beginning with $t=0$. A bypass switch 28 is opened during the beginning of the braking mode, and the voltage signal in line 26 then is an indicator of the instantaneous deceleration. This value may be considered as a second differential of the relationship between travel and time. An integrator circuit 30 integrates this signal to produce a linear relationship which is a measure of vehicle velocity. The integrator circuit has a high gain amplifier with a negative output. It normally is bypassed with a normally closed switch 32. The switch 32 is opened, however, at $t=0$ and remains open during the braking mode.

The control capacitor 34 of the integrator 30 operates with a negative high gain amplifier component to produce a voltage at point 36 which, at any instant during the braking mode, is equal to $$-\int_{t=0}^{t=T} V_a dt$$

where $V_a$ = the voltage in line 26. This value is combined at point 38 with the voltage $V_O$ on the input side of the first adder 20. Because the signals are of opposite sign, the first adder then receives the difference between the two signals. Thus the output voltage $$V_e = V_0 + \int_{t=0}^{t=T} V_a dt$$

A control resistance 44 is in parallel relationship with respect to the high gain amplifier elements of the adder 20.

The second adder 22 is connected at its input side to the output of the first adder. A suitable control resistance $R_c$ shown at 46 is interposed between the output side of the first adder and the input side of the second adder. The frequency to voltage converter 14, which develops a signal $V_u$, is connected also to the same input side of the second adder 22 through a second control resistance $R_w$, as indicated at 48. The magnitude of the resistance $R_w$ is less than the resistance $R_c$.

The second adder also has a control resistance 50 in parallel relationship with high gain amplifier elements. The resultant of the two inputs for the second adder 22 is a voltage signal $V_3$ at point 52, which is equal to the quantity:

$$-(R_3/R_w) V_u + (R_3/R_c) V_c$$

In addition to the so-called wheel speed analog $V_u$ and the negative analog of the vehicle speed, $-V_c$, a third position feedback signal from the brake actuator can be used. This may be the output of a potentiometer 54, the movable element of which is connected to the movable actuator for the brake pressure modulator. Other feedback operations, of course, could be used instead.

The signal output of the potentiometer 54, when combined or added algebraically to the wheel speed analog and the vehicle speed analog, will vary within predetermined tolerance limits the threshold value for the controlled vehicle slip signal thereby making the feedback control for the system more sensitive. If it is assumed, however, that the auxiliary feedback signal produced by the potentiometer 54 is not present, the output signal $V_3$ at point 52 on the output side of the second adder 22 will be equal to the quantity indicated earlier.

If one chooses to make the digital circuit respond to any value of $V_3$ equal to or greater than 0, then the value of $V_u$ may be computed by setting $V_3 = 0$. $V_w$ then equals $V_c \times [1 - (S/100\%)]$. If this value for $V_u$ is substituted in the equation for $V_3$, and if $R_w$ is solved in terms of $R_c$, then $R_w = R_c [1 - (S/100\%)]$. The threshold value then is determined by appropriately choosing the values of $R_w$ and $R_c$. For any quantity $V_3$ greater than that threshold value, the trigger circuit shown at FIG. 1A will be energized.

The trigger circuit is indicated in FIG. 1A by reference character 56. It includes a solenoid 58, which may be energized by the signal received from the slip detector of FIG. 1. That signal may be amplified if desired. Solenoid 58, when it is energized, closes switch 60, which completes the motor circuit for motor 62. The motor 62 drives pump 64, the output side of which communicates with passage 66 through a one way check valve. The input side of pump, which is in fluid communication with reservoir 68, is connected to the input side of the pump through a normally closed relief valve 70.

Gauge 66 communicates with one side of actuator piston 72. If the pump output pressure is sufficient to overcome the force of spring 74, the actuator piston will move, thereby closing valve 76. This interrupts communication between the wheel brakes and the master cylinder 78. As the piston tends to move further to the right, the effective volume for the wheel brake fluid expands, and the braking effort is reduced. This tends to reduce wheel slip, and the motor will cease operating when the threshold point for the slip signal is reached.

The feedback from the feedback detector 80 increases the speed of response to a reduction in slip.

Figure 5:
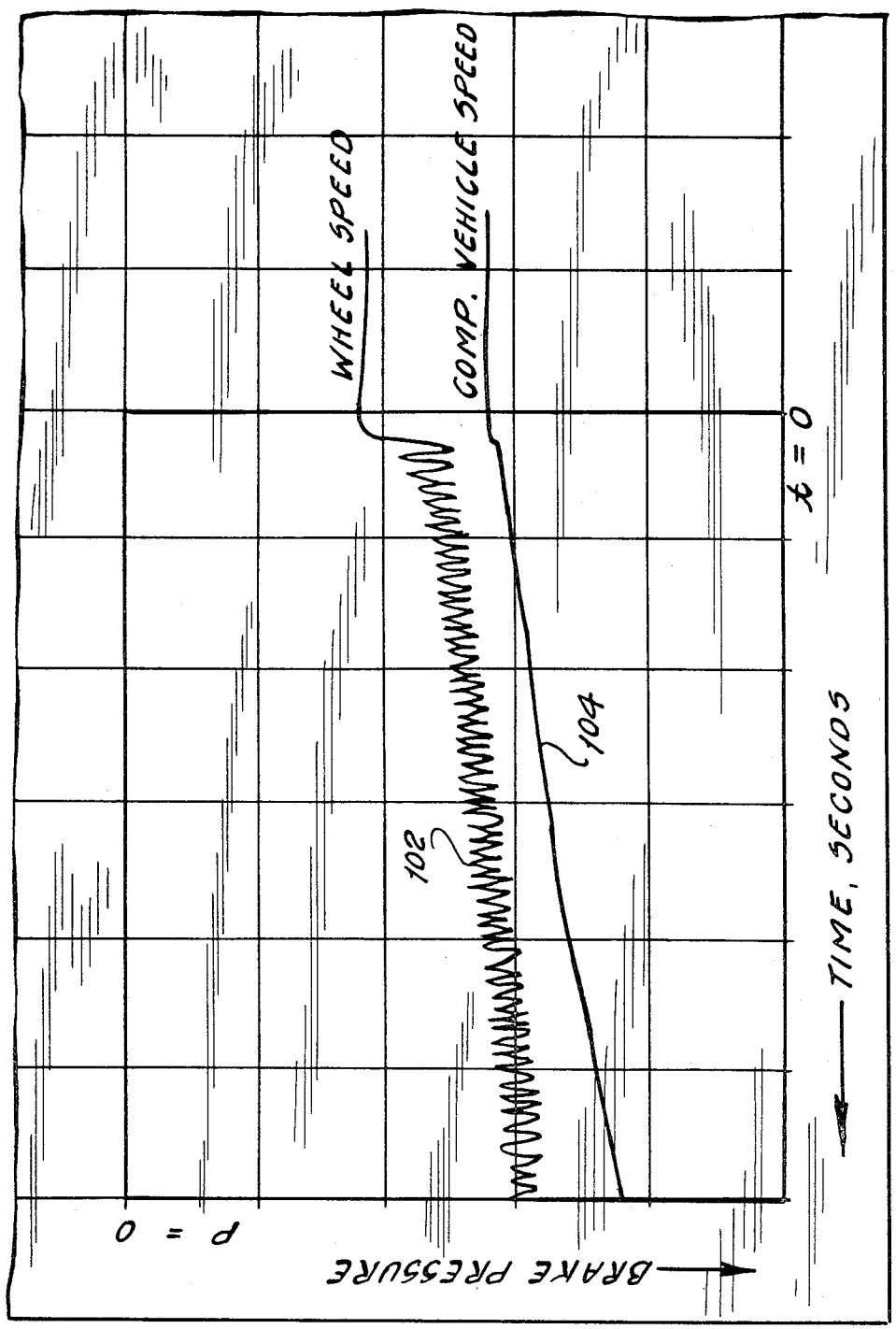
FIG. 5 is a trace recording of velocity speed change during a typical vehicle wheel braking mode.

In FIG. 5 the fluctuations in the effective brake pressure is illustrated. By means of a test trace recording in which the recording time extends along a horizontal axis in a negative direction. The pressure in the wheel brake cylinders is indicated by the fluctuating line 102. The comparable vehicle speed which would exist if no slipping occurred is of a value slightly greater than the wheel speed value as shown at 104. The average percentage error at any instant during the braking mode then can be found by subtracting the average value on curve 102 at any time from the value at that time along curve 104. The ordinate for the chart of FIG. 5 is inverted so that the higher pressures are on the lower part of the graph.

FIG. 5 shows a relatively small overshoot and a fast cycling frequency of approximately 22 cycles per second. This produces accurate wheel speed control about the predetermined slip value. In obtaining this curve 10 percent negative feedback was taken from the brake pressure modulator position potentiometer 80 and added to the speed signals at the input of the second adder.

Figure 3:
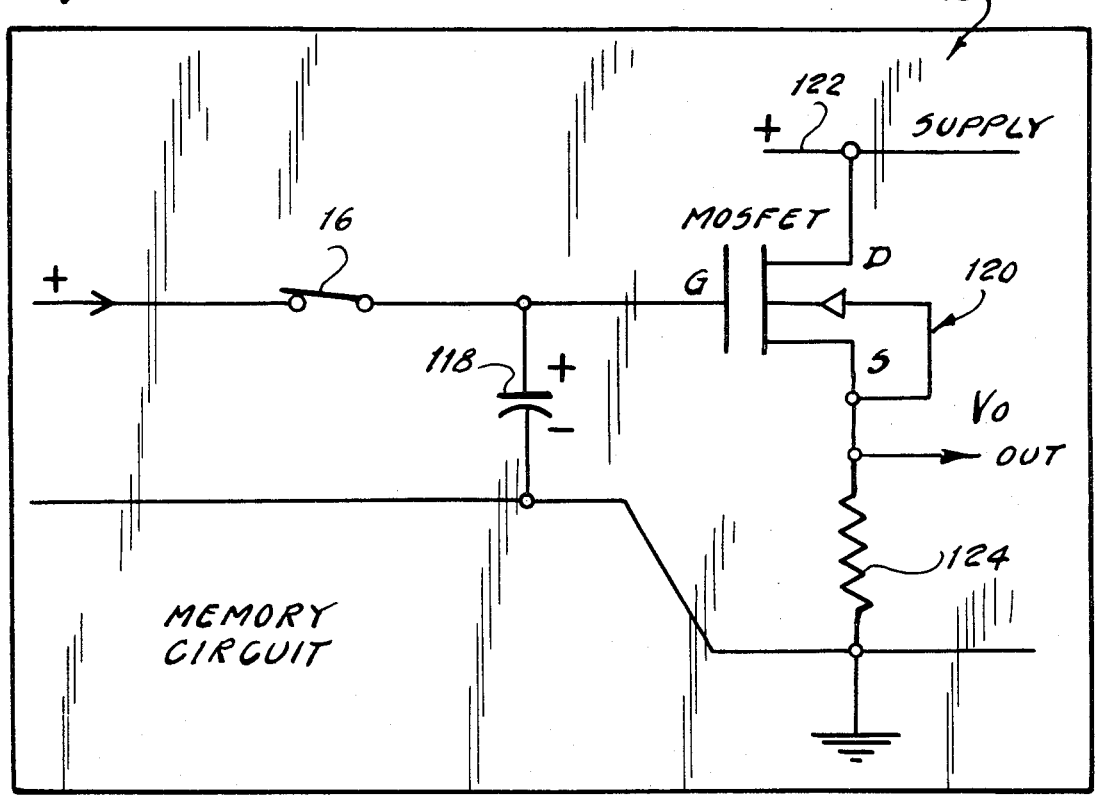
FIG. 3 shows in schematic form a typical memory circuit for use in the circuit of FIGS. 1, 1A and 2.
Figure 4:
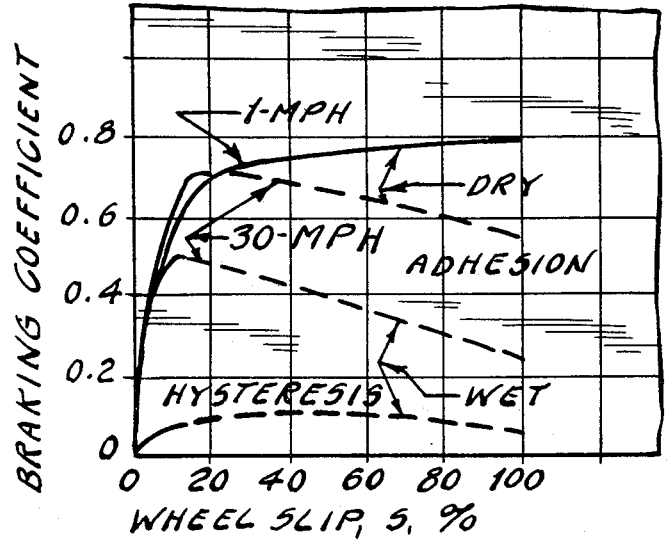
FIG. 4 shows a chart indicating the relationship between wheel slip percentage and brake coefficient for a tire-road interface.

An operating embodiment of the circuit of FIG. 1 is shown at FIG. 2. The frequency to voltage converter 14, as indicated in FIG. 2, includes a capacitor 106 which receives the rectangular wave form signal from the preamplifier 12. Each signal results in a change in the base-emitter bias on transistor 108. When that bias exceeds the threshold value, collector current from the voltage supply line 110 passes through resistor 112 and through diode 114 to one side of capacitor 116, which is the input side of the memory circuit. A typical memory circuit is illustrated in FIG. 3 although it is not necessary to employ this particular form of circuitry. The particular embodiment of FIG. 3 comprises a capacitor 118 which is connected to the gate-controlled field-effect transistor 120, the drain side for which is connected to supply line 122. The sink side of the transistor 122 supplies a control resistor 124 and the voltage appearing across the capacitor then causes the gate to trigger a flow of current through the field-effect transistor 120 causing a voltage drop across resistor 124. This voltage drop is the voltage signal $V_0$, which is used by the first adder 20 in the circuit of FIG. 1 in the manner explained previously.

Having thus described a preferred form of my invention, what I claim and desire to secure by U.S. Letters Patent is:

1. An actuator for an antiskid brake system for a wheeled vehicle, said brake system having a driver operated master brake cylinder for developing brake pressure and a wheel brake cylinder, a fluid passage between said master brake cylinder and said wheel brake cylinder, means for reducing instantaneous pressure in said wheel brake cylinder, said pressure reducing means communicating with said wheel brake cylinder, fluid pump means communicating with said pressure reducing means for pumping fluid pressure thereto and actuating the same to modify the mode of response of said wheel brake cylinder to a braking effort applied to said master brake cylinder, an electric motor means for powering said pump means, and a wheel slip detecting circuit means for energizing said motor means whenever a predetermined wheel slippage occurs, said pressure reducing means including an actuator having a piston, said piston being displaced when said motor is activated, one side of said piston communicating with said brake cylinder whereby the effective volume for the fluid in said passage is increased as said piston is displaced and a one-way check valve means in said passage for interrupting communication between said wheel brake cylinder and said master brake cylinder when said piston is activated by control pressure developed by said fluid pump means and establishing fluid communication between said wheel brake cylinder and said master brake cylinder when said actuator assumes a passive condition.

2. The combination as set forth in claim 1 wherein said actuator includes motion feedback means between said piston and said slip detecting circuit means whereby the speed of response of the latter to a reduction in braking pressure is increased.

* * * * *